United States Patent [19]

Grimes et al.

[11] 4,365,009

[45] * Dec. 21, 1982

[54] METHOD OF IMPROVING THE ION SELECTIVITY OF MEMBRANES

[75] Inventors: Patrick G. Grimes; Richard J. Bellows, both of Westfield, N.J.

[73] Assignee: Exxon Research & Engineering Co., Florham Park, N.J.

[*] Notice: The portion of the term of this patent subsequent to Mar. 31, 1998, has been disclaimed.

[21] Appl. No.: 178,993

[22] Filed: Aug. 18, 1980

Related U.S. Application Data

[63] Continuation-in-part of Ser. No. 128,822, Mar. 10, 1980, Pat. No. 4,259,417.

[51] Int. Cl.$^3$ .............................................. H01M 2/16
[52] U.S. Cl. .................................... 429/50; 429/101; 429/192; 204/296
[58] Field of Search ................ 429/101, 192, 105, 198, 429/50; 204/296, 181 C

[56] References Cited

U.S. PATENT DOCUMENTS

| | | | |
|---|---|---|---|
| 3,015,681 | 1/1912 | Long | 136/111 |
| 3,481,785 | 12/1969 | Ikari | 136/26 |
| 3,657,104 | 4/1972 | Hodgdon | 204/301 |
| 4,074,028 | 2/1978 | Well | 429/105 |
| 4,133,941 | 1/1979 | Sheibley | 429/33 |
| 4,259,417 | 3/1981 | Bellows et al. | 429/101 |

*Primary Examiner*—Donald L. Walton
*Attorney, Agent, or Firm*—Robert S. Salzman

[57] ABSTRACT

The invention features an electrochemical cell having two fluid-containing compartments separated by a non-selective microporous membrane. Select ions which would normally pass through the membrane under the influence of an ionic field, are prevented from passing through the membrane by a polyelectrolyte which has migrated through the compartment fluid to the membrane. The polyelectrolyte acts as an ionic barrier to the passage of select ions, thus effectively increasing the ion-selective capability of the membrane and, hence, the coulombic efficiency of the electro-chemical cell.

25 Claims, 5 Drawing Figures

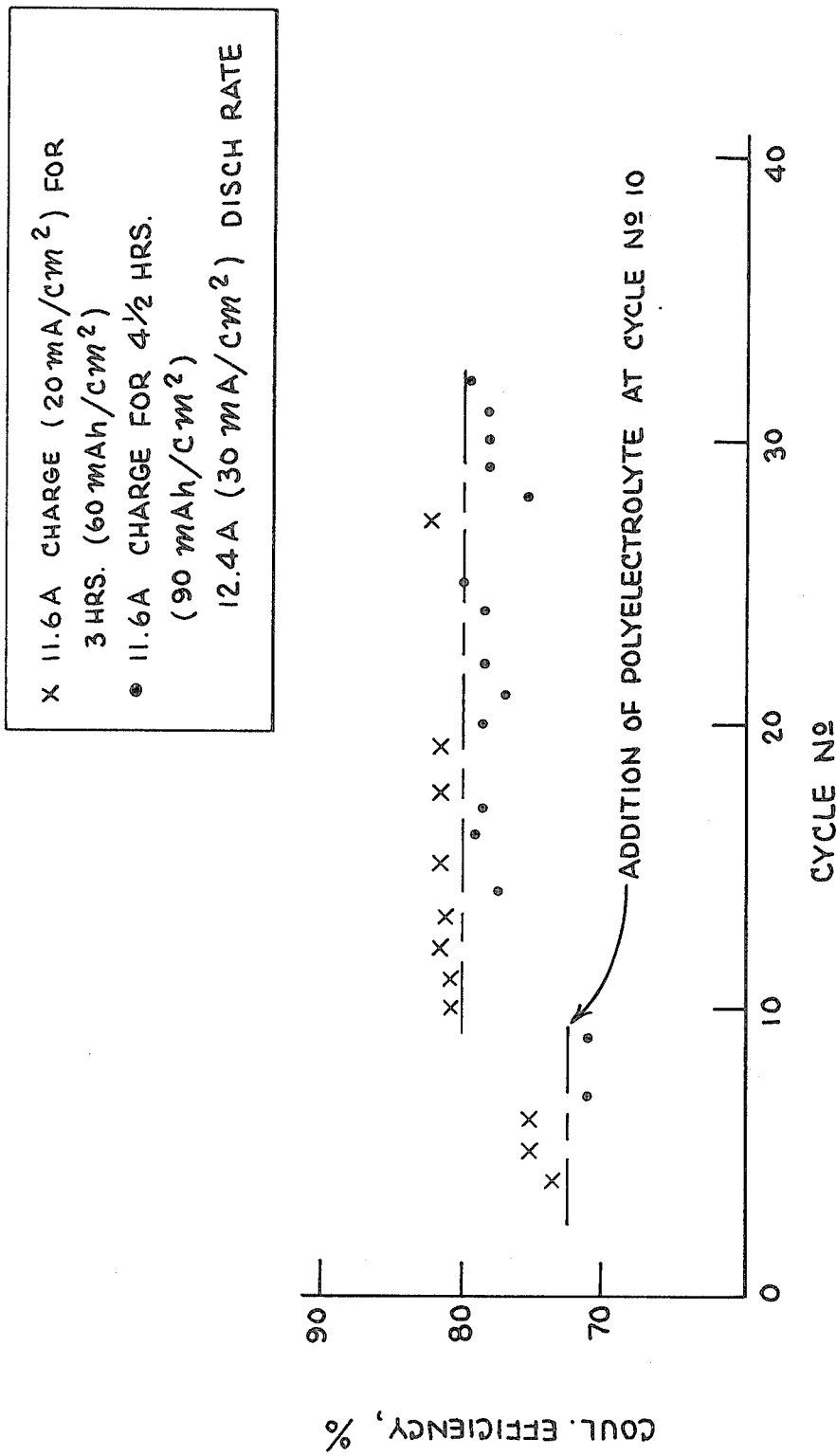

METHOD OF IMPROVING THE ION SELECTIVITY OF MEMBRANES

CROSS-REFERENCE TO RELATED APPLICATIONS

This application is a continuation-in-part of U.S. Ser. No. 128,822, filed Mar. 10, 1980 now U.S. Pat. No. 4,259,417.

FIELD OF THE INVENTION

This invention pertains to electrochemical cells, and more particularly to a method for improving separators or ionic barriers for such cells.

BACKGROUND OF THE INVENTION

In the manufacture of current-producing electrochemical cells, such as secondary battery cells, a membrane separator is often needed between electrode compartments. The membrane separator is required to selectively pass ions from one compartment to the other. These ion-exchange membranes are usually quite expensive, and can be the limiting factor in the cost of production.

Microporous membranes having no ion selectivity have not been successfully substituted for the more expensive ion-selective membranes. Such substitutions generally result in drastic reductions in coulombic efficiencies and are unacceptable from the standpoint of cell performance.

The invention seeks to provide a method of improving the ion selectivity of membranes, wherein a low-cost electrochemical cell with acceptable coulombic efficiencies can be fabricated.

The invention proposes to utilize low-cost, non-selective microporous membranes as battery separators by increasing in situ their capability to pass only select ions, and to furthermore achieve this capability in a low-cost manner.

DISCUSSION OF THE PRIOR ART

The use of ion-selective membranes is well known in the art. These membranes are generally used to obtain high-coulombic efficiencies, prevent dendritic growth, and prevent unwanted ionic migration within electrochemical cells, as set forth in the U.S. Patents to: E. S. Long, entitled: "Primary Cell"; U.S. Pat. No. 3,015,681; issued: Jan. 2, 1962; R. B. Hodgdon, Jr., entitled "Bifunctional Cation Exchange Membranes and Their Use in Electrolytic Cells", U.S. Pat. No. 3,657,104, issued: Apr. 18, 1972; and D. W. Sheibley, entitled: "Formulated Plastic Separators for Soluble Electrode Cells", U.S. Pat. No. 4,133,941, issued: Jan. 9, 1979.

It is also known to add various materials to electrolytes in battery cells to inhibit dendrite formation and improve their charging characteristics, as discussed in the U.S. patents to: F. G. Will, entitled: "Dendrite-Inhibiting Electrolytic Solution and Rechargeable Aqueous Zinc-Halogen Cell Containing the Solution". U.S. Pat. No. 4,074,028, issued: Feb. 14, 1978; and S. Ikari, entitled: "Lead Storage Battery Containing a Sulfonic Acid Substituted Naphthalene/Formaldehyde Condensation Product", U.S. Pat. No. 3,481,785, issued: Dec. 2, 1969.

The prior art is prolific with membranes and electrolyte additives for improving the performance of battery cells, but nowhere is it suggested that the use of an electrolyte additive can inhibit or influence the ionic migration across a nonselective membrane.

SUMMARY OF THE INVENTION

The invention teaches that a microporous nonselective membrane in an electrochemical cell can be modified in situ by polyelectrolyte materials disposed in the cell fluid, which materials migrate to the membrane surface. The polyelectrolytes are generally of a high molecular weight, and may have a generally convoluted shape wherein passage under the influence of an ionic field through the micron-sized pores of the membrane is generally restricted. The pores of the membrane may likewise have irregular or convoluted pathways to further restrict the passage of the polyelectrolytes.

Whether the polyelectrolytes actually penetrate the membrane or only substantially coat the membrane surface is not well understood. However, it has been demonstrated that the polyelectrolytes will form a barrier to unwanted ions, and prevent their migration through the membrane. The ionic barrier is achieved by the physical restraint imposed upon the polyelectrolyte molecules which have migrated to the membrane.

From another point of view, the polyelectrolyte material can be perceived as a means of ionically modifying the membrane in a selective manner in situ, i.e., modifying the selectivity characteristics of the membrane during operation of the cell.

A typical cell utilizing the invention will comprise at least two fluid-containing compartments separated by the nonselective microporous membrane. To the fluid of one of the compartments is added an ion-selective material, such as a polyelectrolyte of high molecular weight. Under the influence of an ionic field, the polyelectrolyte will migrate toward the membrane where it will form an ionic barrier against the unwanted migration and passage of certain ones of the ions in the compartmental fluid.

In a secondary battery cell supporting, for example, a zinc-bromide reaction, such induced ionic selectivity will improve the coulombic efficiency of the cell over that normally expected without the use of the polyelectrolyte.

The method of the invention seeks to improve the ion selectivity of all ion-selective apparatuses by establishing a flow of ions in a fluid containing both ions and a polyelectrolyte. The polyelectrolyte tends to migrate under the influence of the ionic flow and is then restrained against migrating to form an ionically selective barrier to certain ones of the ions in the fluid.

It is an object of the invention to provide an improved method for modifying a barrier or separator for use in an electrochemical cell;

It is another object of this invention to provide a method of modifying in situ a nonselective membrane to effectively produce an ion-selective membrane; and It is a further object of this invention to provide a method of adding an additive to the electrolyte of an electrochemical cell which will form a selective ionic barrier when physically restrained from migrating within an ionic field of the cell.

These and other objects of this invention will become more apparent and will be better understood with reference to the following detailed description considered in conjunction with the accompanying drawings.

BRIEF DESCRIPTION OF THE DRAWINGS

FIG. 4 is another graph illustrating the improvement in coulombic efficiency of an electrochemical bipolar cell with use of the inventive method.

DETAILED DESCRIPTION OF THE INVENTION

Generally speaking, the invention is for a method for modifying an apparatus to improve its ion selectivity. The apparatus generally comprises a fluid containing ions and a flow of the ions is established in the fluid. A polyelectrolyte is disposed in the fluid and tends to migrate under the influence of the ionic flow. The migration of the polyelectrolyte is restrained such that an ionically selective barrier is formed by the polyelectrolyte. Certain ones of the ions in the fluid will be screened from passing through the ionic barrier. The types of ions which can be screened by the polyelectrolyte will depend upon the charge of the polyelectrolyte, i.e., negatively charged ions will be screened by a negatively charged polyelectrolyte barrier; positively charged ions will be screened by a positively charged polyelectrolyte barrier; and screening of either positive or negative ions will be achieved with a barrier formed from an amphoterically charged polyelectrolyte at an appropriate pH.

For the purposes of this description, the term "polyelectrolyte" is generally defined as a substance of high molecular weight (generally greater than 10,000) such as a long-chain polymer, a protein, a macromolecule, a polysaccharide, etc., which has a multiplicity of ionic sites.

The term "microporous membrane" is generally defined as a membrane having a continuous pore network with an average pore size in the range of 0.005–0.30 microns.

It is contemplated that the present invention can be used in a wide variety of systems requiring ionic flow separation and selectivity, such as Fuel Cells, Batteries, electrodialysis and water treatment systems, etc.

The ion-selective barrier can be used in systems wherein an electric field is impressed across the cell, or an ionic fluid flows physically through the cell or device.

Figure 1A:
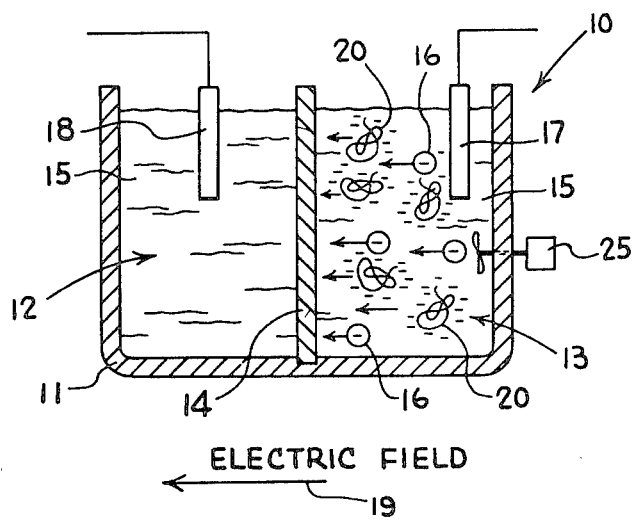
FIG. 1a is a schematic diagram of an electrochemical cell comprising the inventive non-selective porous membrane and polyelectrolyte combination for selectively screening ions migrating in solution. The figure depicts the polyelectrolyte in solution with an electric field being initially impressed across the cell. The polyelectrolyte is shown beginning to migrate towards the membrane.

Now referring to FIG. 1a, a simple electrochemical cell 10 comprising the invention is schematically illustrated. The cell 10 comprises a container 11 which is divided into two fluid-containing compartments 12 and 13, respectively, by a nonselective microporous membrane 14. The fluid 15 in each compartment can be the same or different. In one of the compartments, such as compartment 13, the fluid 15 may contain negative ions 16.

The cell 10 has electrodes 17 and 18 for impressing an electric field across the fluid 15 as shown by arrow 19.

The fluid 15 of compartment 13 contains negatively charged polyelectrolyte molecules 20.

When the electric field is impressed upon the cell, both the negative ions 16 and the polyelectrolyte molecules 20 will tend to migrate toward the positive electrode 18 as shown by the arrows. The membrane 14 will normally pass the negatively charged ions 16, but will not pass the polyelectrolyte molecules 20 because of their size.

Figure 1B:
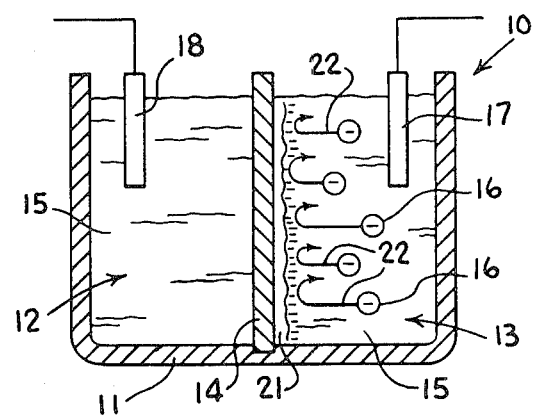
FIG. 1b depicts the cell of FIG. 1 after the polyelectrolyte has migrated to the membrane and formed an ionic barrier.

After a finite period of time, the polyelectrolyte molecules 20 will form a barrier layer 21 upon the membrane 14, as illustrated in FIG. 1b. Whether the polyelectrolyte molecules 20 actually penetrate the membrane pores and get entangled therein due to the convoluted shape of the molecules, or are too big to penetrate the pores, is not fully understood. What is known, however, is that a barrier is created within, or upon, the membrane 14. This barrier, being substantially of the same type of charge (negative) as the ions 16, will tend to repel (arrows 22) these ions from passing through the membrane 14. In this manner, the polyelectrolyte molecules 20 have now transformed the nonselectivity of the membrane 14 into a membrane having selectivity.

In another sense, the membrane 14 can be viewed as acting as a restraint for the polyelectrolyte molecules 20 which form an ionic barrier 21 upon migration to the membrane 14.

The polyelectrolyte molecules 20 can be positively charged where positive ions are meant to be prevented from passing through the membrane.

Both positive and negative ions can be prevented from passing through the membrane with the use of either an amphoterically charged polyelectrolyte or the use of both positive and negative polyelectrolytes in one or more of the compartments 12 and 13, respectively.

Where the polyelectrolyte molecules 20 have a specific gravity greater than the fluid 15, they may tend to sink to the bottom of the compartment 13 during operation or storage of the cell 10. To insure that the polyelectrolyte is properly distributed or circulated in the fluid 15, a stirrer 25 can be utilized.

In other systems the fluid 15 containing the polyelectrolyte 20 can be circulated through the compartment 13 using a conduit (not shown) forming a closed loop feeding into and out of the compartment. A reservoir (not shown) in the closed loop will supply the conduit and compartment with a fresh supply of fluid. A pump (not shown) can be disposed in the conduit to effect the circulation throughout the closed loop.

Figure 2:
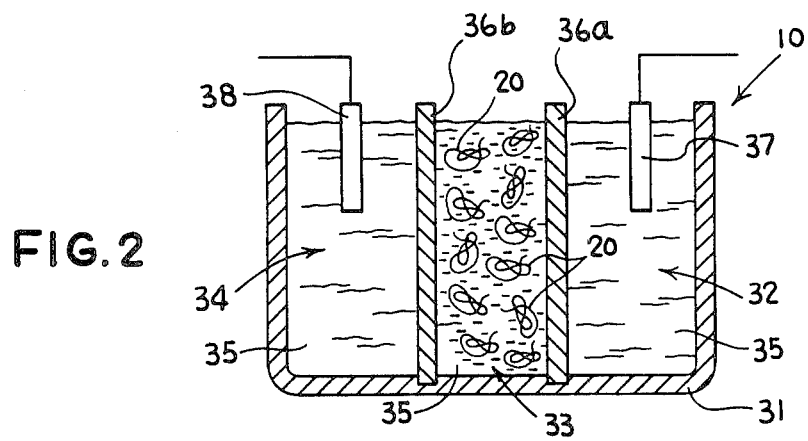
FIG. 2 illustrates an alternate embodiment for the cell shown in FIG. 1.

Referring to FIG. 2, an alternate embodiment is schematically illustrated for the cell 10 of FIGS. 1a and 1b. A cell 10' comprises a container 31 with three separate fluid-containing compartments 32, 33, and 34, respectively. The fluid 35 may be the same or different in each compartment. An electric field can be established across the cell 10' by means of electrodes 37 and 38, respectively.

The cell 10' is divided into the three compartments 32, 33, and 34, respectively, by means of two nonselective microporous membranes 36a and 36b.

The second or middle compartment 33 contains the polyelectrolyte material 20, such that ionic flow in either direction can be made selective, i.e., flow from either compartment 32 to compartment 34, and/or vice versa.

EXAMPLE 1

The invention was tested in a $Zn/Br_2$ battery system of the type shown in the U.S. Patent to: Agustin F. Venero, entitled: "Metal Halogen Batteries and Method of Operating Same"; U.S. Pat. No. 4,105,829; issued: Aug. 8, 1978, the description of which is meant to be incorporated herein by reference. A nine- (9) plate monopolar cell was constructed with ten (10) mil thick Daramic ® membranes separating the compartments. The Daramic ® membranes Series HW-0835 were obtained from W. R. Grace Company, Polyfibron Division, Cambridge, Mass. These membranes are microporous and ionically nonselective and are the type generally used in automotive batteries. These membranes had an average pore size of 0.05 microns (BET method), with a maximum pore size of 0.10 microns. The average pore volume was 55±5%.

Figure 3:
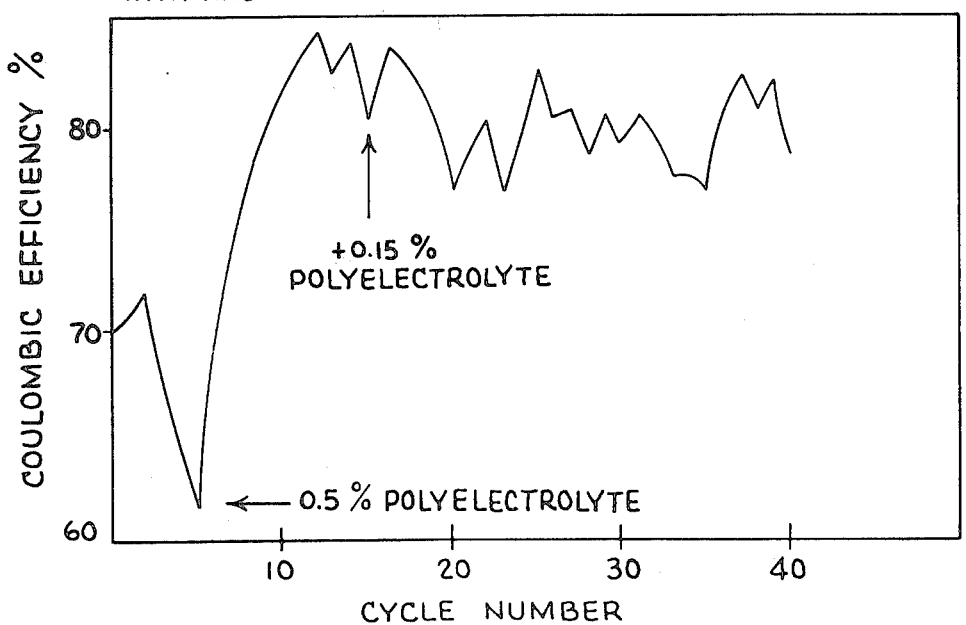
FIG. 3 is a graph showing the improvement in coulombic efficiency with the use of the invention.

The coulombic efficiency of this electrochemical cell was tested with and without the use of a polyelectrolyte. The polyelectrolyte used in the tests was a sulfonated polystyrene of about 70,000 molecular weight and known under the product name of Versa-TL 72-SD, made by National Starch, Bound Brook, N.J. The cell was run through forty (40) cycles as shown in FIG. 3. About 0.5 percent by weight of the Versa polyelectrolyte was added to the catholyte at the fifth (5th) cycle, and about 0.15 percent by weight of the Versa polyelectrolyte was added at the fifteenth (15th) cycle, as shown. At the twenty-third (23rd) and thirty-fifth (35th) cycles, the system was discharged at 1 amp., till an OCV of $-1.7$ volts was obtained, and then charged at 1 amp. till an OCV of $+1.7$ volts was acheived.

As can be observed from FIG. 3, the addition of the polyelectrolyte improved the coulombic efficiency of the System from approximately 62% to approximately 80-85%.

The results of the test illustrated in FIG. 3 are also shown in Tabular form in Table I below.

TABLE I

| NINE- (9) PLATE MONOPOLAR UNTREATED DARAMIC ® 10 MIL THICK FLAT SHEET | |
|---|---|
| Cycle No. | Efficiency |
| 1 | 70.7% |
| 2 | 72.2 |
| 3 | 67.4 |
| 4 | 65.7 |
| 5 | 61.5 |
| add 0.50 wt % polyelectrolyte | |
| 6 | 67.8 |
| 7 | 73.7 |
| 8 | 76.2 |
| 10 | 81.9 |
| 11 | 82.6 |
| 12 | 84.2 |
| 13 | 82.4 |
| 14 | 83.9 |
| add 0.15 wt % polyelectrolyte catholyte | |
| 15 | 80.0 |
| 16 | 83.3 |
| 17 | 83.0 |
| 18 | 82.1 |
| 20 | 76.8 |
| 21 | 79.7 |
| 22 | 80.6 |
| 23 | 76.8 |
| 24 | 79.8 |
| 25 | 82.5 |
| 26 | 80.4 |
| 27 | 80.9 |

TABLE I-continued

| NINE- (9) PLATE MONOPOLAR UNTREATED DARAMIC ® 10 MIL THICK FLAT SHEET | |
|---|---|
| Cycle No. | Efficiency |
| 28 | 78.3 |
| 29 | 80.7 |
| 30 | 79.1 |
| 31 | 80.6 |
| 32 | 79.4 |
| 33 | 77.5 |
| 34 | 77.8 |
| 35 | 76.9 |
| 36 | 81.2 |
| 37 | 82.2 |
| 38 | 80.8 |
| 39 | 82.3 |
| 40 | 78.6 |

EXAMPLE 2

The above cell of Example 1 was again constructed as before, but now using microporous membranes of CELGARD-2400+2500, made by Celanese Corp., having an average pore size of 0.02–0.4 microns. These membranes produced a cell having a coulombic efficiency of approximately 50–55%. Addition of 0.15 weight% of the Versa polyelectrolyte increased the coulombic efficiency to about 70%.

EXAMPLE 3

A bipolar $Zn/Br_2$ battery was constructed in accordance with the teachings of the U.S. Pat. No. 4,105,829, previously mentioned. The battery comprised eight (8) cells (12 V.) of approximately 6 $dm^2$. Daramic ® membranes of 24 mil thickness were used but otherwise similar to those described in Example 1. The polyelectrolyte used was Versa-TL 72-SD as mentioned before. The test procedure comprised a charge-discharge cycling of the battery. Charging was done at 11.6 Amps (20 $mA/cm^2$) for 3 hours and 60 and 90 mA-h/$cm^2$ Zn loading for 4½ hours. Discharging was accomplished at 17.4 A (30 $mA/cm^2$) to 8 V. The first 25 cycles were run using an electrolyte of 3 M $ZnBr_2$ and 1.0 M N-ethyl, N-Methylmorpholinium Bromide:

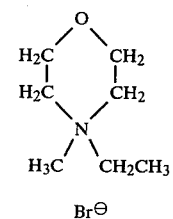

The electrolyte was then changed to 3 M $ZnBr_2$ and 0.5 M N-ethyl, N-Methylmorpoholinium/0.5 M N-ethyl, N-methylpyrolidinium Bromide:

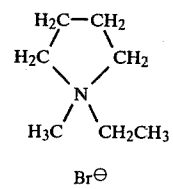

FIG. 4 depicts the test results in terms of coulombic efficiency vs. cycle number.

The Versa-TL72-SD was added at cycle number 10. The coulombic efficiency was noted to increase from about 72% without the polyelectrolyte to approximately 80% with the addition of the polyelectrolyte.

In these examples, the coulombic efficiency of the Zn/Br$_2$ battery was decreased by self-discharge when bromine migrates to the zinc electrode. In solution, bromine exists as a negatively charged Br$_3^\ominus$ which is repelled by negatively charged ion-selective membranes, thereby improving coulombic efficiency.

The above examples are meant to be merely exemplary teachings of how the invention may be practiced.

The microporous Daramic ® membranes which have been found to work most satisfactorily in this invention have an average pore size of about 0.01 to 0.06 microns, but other materials and pore sizes may be possible. The membranes may be manufactured from a polypropylene or a polystyrene or other suitable polymer. Such membranes will generally comprise 30 to 90% void space.

The polyelectrolyte as used in cells of the general type described herein, may be either a sulfonated or carboxylated polystyrene. Other cells will naturally require different polyelectrolyte materials.

Having thus described the invention, what is meant to be protected by Letters Patent is presented in the following appended claims.

What is claimed is:

1. In an electrochemical cell, comprising: a first fluid-containing compartment; a second fluid-containing compartment; a nonselective porous membrane disposed between said first and second fluid-containing compartments; A method of modifying the ion selectivity of said membrane comprising the steps of:
   (a) passing ions through said membrane; and
   (b) migrating a polyelectrolyte disposed in a fluid of at least one of said compartments towards, and forming an ionic barrier at, said membrane in response to the ionic flow through said membrane, said polyelectrolyte modifying the ion selectivity of said membrane by causing substantially only selected ions to pass through said membrane.

2. The method of claim 1, wherein said polyelectrolyte is substantially negatively charged.

3. The method of claim 1, wherein said polyelectrolyte is substantially positively charged.

4. The method of claim 1, wherein said polyelectrolyte is amphoterically charged.

5. The method of claim 1, wherein said polyelectrolyte contains a sulfonated polystyrene.

6. The method of claim 1, wherein said polyelectrolyte contains a carboxylated polystyrene.

7. The method of claim 1, wherein said membrane is microporous.

8. The method of claim 1, further comprising the step of circulating fluid in at least one of said fluid-containing compartments.

9. In an electrochemical cell, comprising: a first fluid-containing compartment; a second fluid-containing compartment; a third fluid-containing compartment; a first nonselective porous membrane of a set disposed between said first and second fluid-containing compartments; a second nonselective porous membrane of said set disposed between said second and third fluid-containing compartments; the method of modifying the ion selectivity of said membranes comprising the steps of:
   (a) passing ions through said membranes;
   (b) adding a polyelectrolyte to a fluid of said second fluid-containing compartment; and
   (c) passing only selected ions through said set of membranes.

10. The method of claim 9, wherein said polyelectrolyte is substantially negatively charged.

11. The method of claim 9, wherein said polyelectrolyte is substantially positively charged.

12. The method of claim 9, wherein said polyelectrolyte is amphoterically charged.

13. The method of claim 9, wherein said polyelectrolyte contains a sulfonated polystyrene.

14. The method of claim 9, wherein said polyelectrolyte contains a carboxylated polystyrene.

15. The method of claim 9, wherein said membranes are microporous.

16. The method of claim 9, further comprising the step of: circulating a fluid in at least one of said fluid-containing compartments.

17. In an ion-selective apparatus, the method of improving the ion selectivity of said apparatus comprising the steps of:
   (a) establishing a flow of ions in a fluid containing both ions and a polyelectrolyte, said polyelectrolyte tending to migrate under the influence of said ionic flow; and
   (b) restraining said polyelectrolyte against migration in said fluid, whereby said polyelectrolyte will form an ionically selective barrier to certain ones of said ions in said fluid.

18. The method of claim 17, wherein said polyelectrolyte is substantially negatively charged.

19. The method of claim 17, wherein said polyelectrolyte is substantially positively charged.

20. The method of claim 17, wherein said polyelectrolyte is amphoterically charged.

21. The method of claim 17, wherein said polyelectrolyte contains a sulfonated polystyrene.

22. The method of claim 17, wherein said polyelectrolyte contains a carboxylated polystyrene.

23. The method of claim 17 wherein the ion-selective apparatus is contained within a battery system.

24. The method of claim 23, wherein the battery system is rechargeable.

25. The method of claim 24 wherein the battery system is a zinc-bromine system.

* * * * *